3,023,240
PREPARATION OF N,N'-DISUBSTITUTED MALEAMIDES

Carol K. Sauers, Middlebush, and Robert J. Cotter, New Brunswick, N.J., assignors to Union Carbide Corporation, a corporation of New York
No Drawing. Filed May 24, 1960, Ser. No. 31,256
12 Claims. (Cl. 260—561)

This invention relates to N,N'-disubstituted maleamides. More particularly, this invention relates to the preparation of N,N'-disubstituted maleamides by reacting an N-substituted isomaleimide with an organic monoamine.

The preparation of N,N'-disubstituted maleamides has been accomplished, in general, by reacting organic amines with maleic anhydride under vigorous reaction conditions. Preparation of N,N'-disubstituted maleamides by the method described has been unsatisfactory, however, as the product obtained contains relatively large quantities of undesirable resinous by-products and also contains relatively large quantities of the isomeric form of the N,N'-disubstituted maleamides, i.e., the N,N'-disubstituted fumaramides.

The present invention provides for the preparation of N,N'-disubstituted maleamides in satisfactory yields and without the substantial formation of undesirable resinous by-products and/or N,N'-disubstituted fumaramides by admixing an N-substituted isomaleimide with an organic monoamine whereby the N-substituted isomaleimide and the organic monoamine react to produce the corresponding N,N'-disubstituted maleamide.

The N-substituted isomaleimides which are reacted with the organic monoamines in accordance with the present invention are those having the general formula:

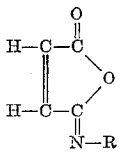

in which R is a monovalent hydrocarbon radical.

The term monovalent hydrocarbon radical as used herein is intended to encompass substituted hydrocarbon radicals as well as unsubstituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following: N-methyl isomaleimide, N-ethyl isomaleimide, N-n-propyl isomaleimide, N-allyl isomaleimide, n-butyl isomaleimide, N-tertiaryl butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-docosyl isomaleimide, N-cyclohexyl isomaleimide, N-(2-chloroethyl) isomaleimile, N-(2-bromoethyl isomaleimide, N-(2-fluoroethyl) isomaleimide, N-(2-iodo-n-propyl) isomaleimide, N-(2-chloro-n-hexyl) isomaleimide, N-methoxymethyl isomaleimide, N-benzyl isomaleimide, N-(2-phenylethyl) isomaleimide, N-(3-phenyl-n-propyl) isomaleimide, N-(4-phenyl-n-butyl) isomaleimide, N-phenyl isomaleimide, N-naphthyl isomaleimide, N-(o-chlorophenyl) isomaleimide, N-(m-bromophenyl) isomaleimide, N-(p-fluorophenyl) isomaleimide, N-(o-iodophenyl) isomaleimide, N-(o-methoxyphenyl) isomaleimide, N-(m-methoxyphenyl) isomaleimide, N-(p-ethoxyphenyl) isomaleimide, N-(p-n-butoxyphenyl) isomaleimide, N-(p-chloro-m-methylphenyl) isomaleimide, N-(o-methylphenyl) isomaleimide, N-(m-methylphenyl) isomaleimide, N-(o-ethylphenyl) isomaleimide, N-(m-ethylphenyl) isomaleimide, N-(p-ethylphenyl) isomaleimide, N-(o-isopropylphenyl) isomaleimide, N-(m-isopropylphenyl) isomaleimide, N-(p-isopropylphenyl) isomaleimide, N-(o-n-butylphenyl) isomaleimide, N-(m-n-butylphenyl) isomaleimide, N-(4-hydroxy-2-naphthyl) isomaleimide, N-(4-hydroxy-1-naphthyl) isomaleimide, and the like.

Particularly desirable N-substituted isomaleimides for purposes of this invention are those having the general formula previously given wherein R contains a maximum of 20 carbon atoms and is free of interfering groups, i.e., COOH and NH$_2$.

N-substituted isomaleimides can be produced by reacting an N-substituted maleamic acid having the general formula:

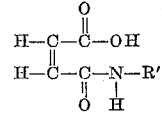

wherein R' is a hydrocarbon radical as previously defined for R, with a carbodiimide having the general formula:

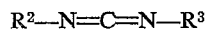

wherein R$^2$ and R$^3$ are hydrocarbon radicals. The preparation of N-substituted isomaleimides is described in detail in our copending application Serial No. 851,029 filed November 5, 1959, which is incorporated herein by reference.

Suitable organic monoamines which can be reacted with the N-substituted isomaleimides are those containing at least one amino hydrogen atom per molecule.

Illustrative of suitable monoamines are saturated aliphatic primary amines, such as methylamine, ethylamine, isopropylamine, n-butylamine, isobutylamine, isoamylamine, n-hexylamine, n-heptylamine, n-octylamine, n-dodecylamine, 2-chloroethylamine, 2-bromoethylamine, 2-fluoroethylamine, methoxymethylamine, 2-phenoxy-n-propylamine, benzylamine, 2-phenethylamine, 4-phenyl-n-butylamine, and the like; unsaturated, aliphatic primary amines, such as allylamine, and the like; cycloaliphatic primary amines, such as cyclohexylamine, chlorocyclohexylamine, and the like; aromatic primary amines, such as p-toluidine, o-p-xylylidine, o-ethylaniline, m-ethylaniline, p-ethylaniline, o-isopropylaniline, m-isopropylaniline, p-isopropylaniline, o-n-butylaniline, m-n-butylaniline, p-n-butylaniline, p-n-octylaniline, o-chloroaniline, m-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, 4-sulfamylaniline, and the like; saturated aliphatic secondary amines, such as dimethylamine, diethylamine, di-n-propylamine, di-n-butylamine, and the like; secondary aromatic amines, such as N-methylaniline, N-ethylaniline, and the like; heterocyclic secondary amines, such as piperidine and the like.

Particularly desirable organic monoamines having at least one amino hydrogen atom are those containing a maximum of 10 carbon atoms and being free of interfering groups, i.e., COOH and OH.

The preparation of N,N-disubstituted maleamides can be illustrated by the reaction between N-phenyl isomaleimide and aniline, a primary amine, and by the reaction of N-phenyl isomaleimide with diethylamine, a secondary amine to produce the corresponding N,N'-disubstituted maleamides. These reactions can be represented by the following equations.

EQUATION 1.—EXEMPLIFYING THE REACTION INVOLVING A PRIMARY MONOAMINE

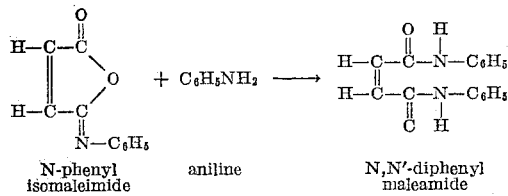

EQUATION 2.—EXEMPLIFYING THE REACTION INVOLVING A SECONDARY MONOAMINE

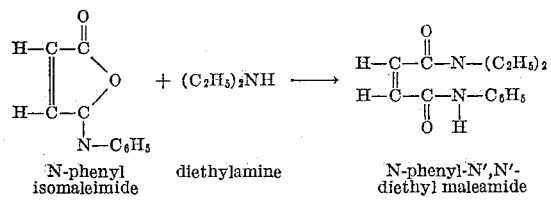

Various amounts of the organic monoamines having at least one aminohydrogen atom and of the N-substituted isomaleimides can be reacted. Generally, using from about 0.9 to about 1.5 moles of the organic monoamine per mole of the N-substituted isomaleimide is satisfactory. Reacting a mixture containing more than about 1.5 moles of the organic monoamine per mole of the N-substituted isomaleimide does not materially increase the yield of N,N'-disubstituted maleamides and is economically undesirable. Optimum results with respect to both yield and purity of product are achieved using equimolar amounts of the two reactants.

The temperature at which the reaction between the N-substituted isomaleimide and the organic monoamine is conducted can also vary over a wide range, from as low as about 0° C. to a temperature just below the decomposition point of the starting materials and of the N,N'-disubstituted maleamide which is to be formed. At temperatures lower than about 0° C., the reaction proceeds sluggishly. A temperature in the range of about 20° C. to about 100° C. is most preferred.

It is also preferred to conduct the reaction between the organic monoamine and the N-substituted isomaleimide in the presence of an organic diluent which is a solvent for the starting materials and is non-reactive with respect to the starting materials and the final product. The use of an organic diluent facilitates removal of the N,N'-disubstituted maleamide from the reaction mixture. The actual organic diluent used will depend upon the starting materials and the temperature at which the reaction is to be conducted. The organic diluent should have a boiling point equal to or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane and the like, ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide, petroleum ether, and the like.

The reaction between the N-substituted isomaleimides and the amines is conducted, generally, under atmospheric pressure, although if desired, the reaction can be conducted under subatmospheric or superatmospheric pressure.

The process of the present invention is conducted by simply admixing an N-substituted isomaleimide and an organic monoamine at the desired temperature. The reaction between the N-substituted isomaleimide and the organic monoamine to produce the corresponding N,N'-disubstituted maleamide is practically instantaneous in that some of the desired maleamide is formed immediately upon admixing the reactants. It is customary, however, to allow the reaction mixture to stand for at least about one hour in order to insure that the reaction has proceeded to completion.

Recovery of the N,N'-disubstituted maleamide from the reaction mixture can be accomplished by any one of a number of convenient methods. For example, in those instances wherein the N,N'-disubstituted maleamide is a solid, it can be recovered as a filter cake and, if desired, purified by column chromatography in order to insure removal of unreacted materials. Alternatively, the N,N'-disubstituted maleamides can be recrystallized from suitable solvents. If the N,N'-disubstituted maleamide is a liquid, it can be recovered as a distillate from the reaction mixture.

The N,N'-disubstituted maleamides are known compounds and can be used as comonomers in vinyl polymerizations as described in U.S. Patents 2,790,784 and 2,794,793.

The following examples further illustrate the present invention and are not intended to limit the scope thereof in any manner.

*Example 1*

REACTION OF N-PHENYL ISOMALEIMIDE WITH ANILINE

To 100 ml. of diethyl ether contained in a round bottomed flask there was added to and dissolved therein 7.5 grams of N-phenyl isomaleimide. 4.6 grams of aniline were added to the solution and the resultant mixture was allowed to stand at room temperature, about 25° C., for 2½ days. The solid which precipitated out was recovered as a filter cake and was then recrystallized from methanol. The product was further purified by passing it through a column of Florisil in benzene. Nine grams of N,N'-diphenyl maleamide were obtained having a capillary melting point 184° C.–186° C.

The infra-red spectrum of the product was consistent with the N,N'-diphenyl maleamide structure. The literature melting point of N,N'-diphenyl maleamide is 184° C.–186° C., as reported in V. Dorp. Rec. Trav. Chim., 19, 311 (1900); 25, 103 (1906).

*Example 2*

REACTION OF N-BUTYL ISOMALEIMIDE WITH N-n-BUTYLAMINE

To 35 ml. of anhydrous diethyl ether contained in a round bottomed flask there was added to and dissolved therein 3.12 grams of N-n-butyl isomaleimide. 1.14 grams of n-butylamine dissolved in 15 ml. of diethyl ether were added dropwise and with stirring into the N-n-butyl isomaleimide solution. Stirring of the mixture was continued for 12 hours and then there was added to the mixture 2.9 grams of n-butylamine. The mixture was heated for 10 minutes at reflux on a steam bath, removed from the steam bath, cooled to about 25° C. and filtered. Two grams of a white solid were recovered as a filter cake. The product sublimed when heated at 190° C.

The product was identified as N,N'-di-n-butyl maleamide by infra-red analysis. The product was conclusively proved to be N,N'-di-n-butyl maleamide by the fact that a small sample of this product absorbed one molar equivalent of hydrogen in the presence of Adam's catalyst, i.e. PtO₂ to give N,N'-di-n-butyl succinamide according to the equation:

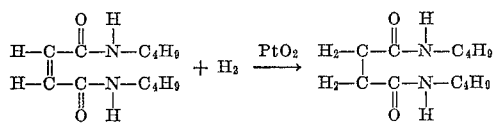

The capillary melting point of the N,N'-di-butyl succinamide produced was 185° C. The reported melting point of the N,N'-di-n-butyl succinamide is found in J. Am. Chem. Soc., 77, 1103 (1955), to be 183° C.–185° C.

What is claimed is:

1. Process for the preparation of N,N'-disubstituted maleamides which comprises admixing an organic monoamine having at least one aminohydrogen atom per molecule with an N-substituted isomaleimide having the formula:

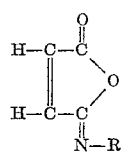

wherein R is a monovalent hydrocarbon radical, whereby the said isomaleimide and the said organic monoamine react to produce the corresponding N,N'-disubstituted maleamide.

2. Process as defined in claim 1 wherein the organic monoamine is n-butyl amine.

3. Process as defined in claim 1 wherein the organic monoamine is aniline.

4. Process as defined in claim 1 wherein the N-substituted isomaleimide is N-phenyl isomaleimide.

5. Process as defined in claim 1 wherein the N-substituted isomaleimide is N-n-butyl isomaleimide.

6. Process for the preparation of N,N'-disubstituted maleamides which comprises admixing an N-substituted isomaleimide having the formula:

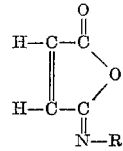

wherein R is a monovalent hydrocarbon radical with from about 0.9 to about 1.5 moles of an organic monoamine, having at least one aminohydrogen atom per molecule, per mole of said isomaleimide whereby the said isomaleimide and the said organic monoamine react to produce the corresponding N,N'-disubstituted maleamide.

7. Process for the preparation of N,N'-disubstituted maleamides which comprises admixing at temperatures in the range of about 0° C. to a temperature just below the decomposition temperature of the reactants and the N,N'-disubstituted maleamide formed, an N-substituted isomaleimide having the formula:

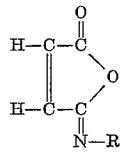

wherein R is a monovalent hydrocarbon radical with from about 0.9 to about 1.5 moles of an organic monoamine, having at least one aminohydrogen atom per molecule, per mole of said isomaleimide, whereby the said isomaleimide and the said organic monoamine react to produce the corresponding N,N'-disubstituted maleamide.

8. Process for the preparation of N,N'-disubstituted maleamides which comprises admixing at a temperature of about 0° C. to about 100° C. equimolar amounts of an N-substituted isomaleimide having the formula:

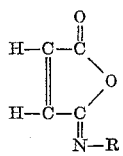

wherein R is a monovalent hydrocarbon radical and an organic monoamine having at least one amino hydrogen atom per molecule, whereby the said isomaleimide and the said organic monoamine react to produce the corresponding N,N'-disubstituted maleamide.

9. Process as defined in claim 8 wherein the reaction is conducted in an organic diluent.

10. Process as defined in claim 9 wherein the organic diluent is diethyl ether.

11. Process for the preparation of N,N'-disubstituted maleamides which comprises admixing in an organic diluent and at a temperature in the range of from about 20° C. to about 100° C. equimolar amounts of an N-substituted isomaleimide having the formula:

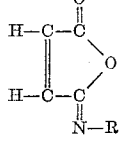

wherein R is a monovalent hydrocarbon radical and an organic monoamine having at least one amino hydrogen atom per molecule, whereby the said isomaleimide and the said organic monoamine react to produce the corresponding N,N'-disubstituted maleamide.

12. Process for the preparation of N,N'-disubstituted maleamides which comprises admixing in an organic diluent and at a temperature in the range of from about 20°

C. to about 100° C., an N-substituted isomaleimide having the formula:

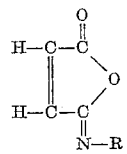

wherein R is a monovalent hydrocarbon radical selected from the group consisting of alkyl radicals and aryl radicals with from about 0.9 to about 1.5 moles of an organic monoamine, having at least one aminohydrogen atom per molecule, per mole of said isomaleimide, said monoamine being selected from the group consisting of saturated, aliphatic primary amines and aromatic primary amines, whereby the said isomaleimide and said organic monoamine react to produce the corresponding N,N'-disubstituted maleamide.

No references cited.